July 20, 1965
W. A. MOREY
3,195,941
VACUUM GRIPPING PAD
Filed Aug. 27, 1962
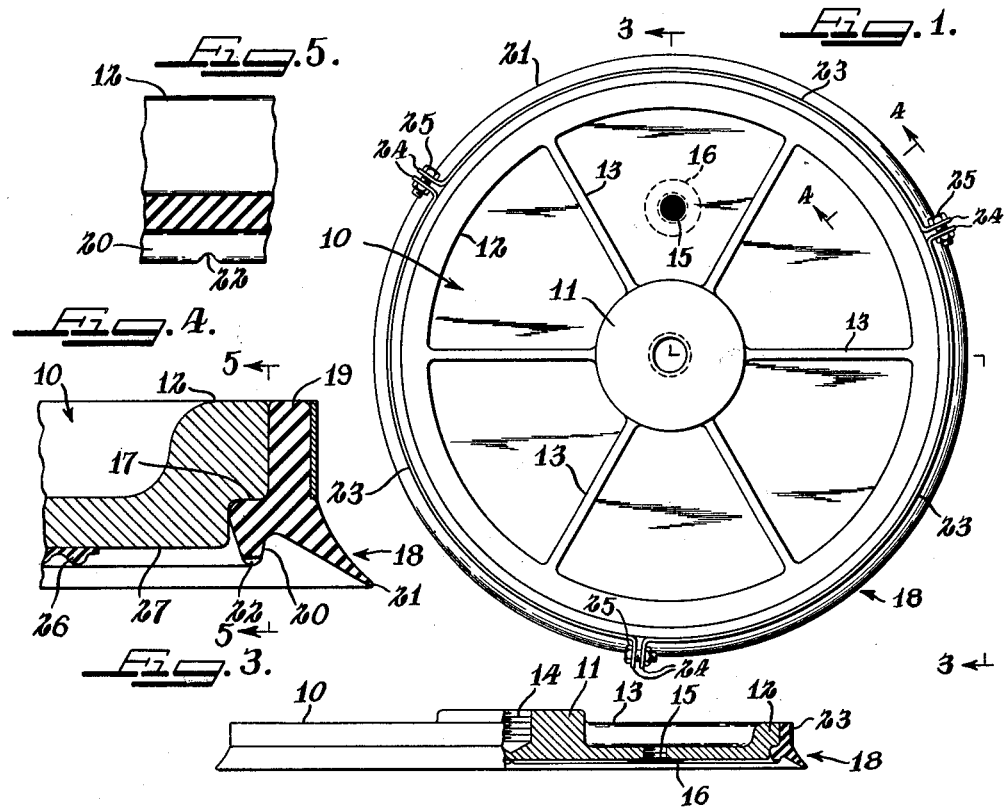
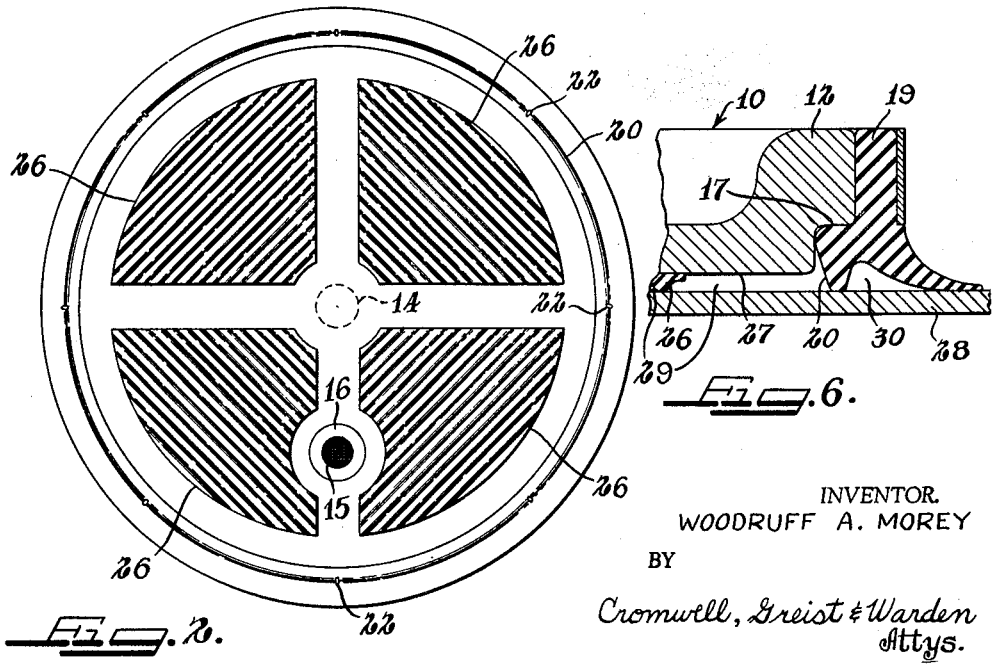
INVENTOR.
WOODRUFF A. MOREY
BY
Cromwell, Greist & Warden
Attys.

United States Patent Office 3,195,941
Patented July 20, 1965

3,195,941
VACUUM GRIPPING PAD
Woodruff A. Morey, Flossmor, Ill., assignor to Whiting Corporation, a corporation of Illinois
Filed Aug. 27, 1962, Ser. No. 219,697
4 Claims. (Cl. 294—64)

This invention relates to vacuum gripping pads and more particularly to the flexible sealing ring which extends around the periphery of such a pad.

Vacuum gripping pads of the kind mentioned above, for an example, see U.S. Patent 3,008,747 to Lytle, are in widespread commercial use. They have been found to be very effective in the handling of large sheet-like sections of metal, glass or any other material that is made in sheet form. Generally, these grippers include a pad containing a port extending completely through the pad and opening at the bottom or material-engaging face thereof. The port is adapted to be placed in communication with means for producing a vacuum. Extending around the periphery of the pad and adapted for sealing engagement with the work sheet to be handled is a flexible sealing ring. Appropriate support means is secured to the pad to permit the manipulation of the same. When it is desired to grip a piece of work with the vacuum gripping pad, the work is approached by the pad until the work engaging surface of the sealing ring thereon is in contact with the work. A vacuum is applied to the pad which forces the sealing ring into sealing engagement with the work sheet. Continued evacuation of air from beneath the pad results in the production of a force which securely maintains the work sheet to the vacuum gripping pad.

Most often in vacuum gripping pads of the type described the flexible sealing ring is bolted in a groove extending along the periphery of the pad. A major factor contributing to the total cost of such a pad is the expense involved in the machining and drilling of the pad at the periphery thereof to adapt it for reception of the sealing ring. Of course it will be readily apparent that the success and efficiency of a vacuum gripping pad of this nature depends to a large part on the attachment and proper functioning of the sealing ring. If the sealing ring allows any leakage along its surface which is in contact with the work sheet, the vacuum under the gripping pad will be destroyed allowing the work sheet to become separated from the gripping pad. If this occurs damage will most likely result to the work sheet being manipulated.

Accordingly, it is a principal object of this invention to provide a vacuum gripping pad having a flexible sealing ring extending along the periphery thereof wherein the sealing ring is adapted to be secured to the pad without machining or drilling at the periphery of the pad.

It is a further object of this invention to provide a vacuum gripping pad having a flexible sealing ring which is adapted to be easily and quickly clamped to the pad at the periphery thereof.

It is an even further object of this invention to provide a vacuum gripping pad having a flexible sealing ring extending around the periphery thereof which will form an effective seal with the work sheet being gripped.

It is a still further object of this invention to provide a vacuum gripping pad having an improved flexible seal extending around the periphery thereof which will form two vacuumized chambers between the bottom face of the pad and the work sheet.

It is a still further object of this invention to provide a vacuum gripping pad having a flexible sealing ring which is easy and inexpensive to manufacture and which will be quite durable, insuring a long and useful life of the vacuum gripping pad.

These and other advantages and objects of the invention will become apparent from the following specification wherein like numerals refer to similar parts throughout.

In the drawings:
FIG. 1 is a top plan view of the vacuum gripping pad of this invention;
FIG. 2 is a bottom plan view thereof;
FIG. 3 is a partial elevation and a partial vertical section along the line 3—3 of FIG. 1;
FIG. 4 is a section taken along the line 4—4 of FIG. 1;
FIG. 5 is a section taken along the line 5—5 of FIG. 4; and
FIG. 6 is a section similar to FIG. 4 showing the vacuum gripping pad in engagement with a sheet of work.

Referring to FIGS. 1–5, the embodiment of the invention shown for purposes of illustration will be seen to include a circular vacuum gripping pad 10 having a hub 11 and a rim portion 12. A plurality of spokes or radial ribs 13 integral with the pad 10 are provided for reinforcing the same. Preferably the hub 11 includes a central bore 14 appropriately threaded for attachment of support means used to manipulate the vacuum gripping pad. The pad 10 contains a port 15 which extends completely through the pad; it is usually threaded for connection with a flexible conduit or the like which is in turn in communication with means for producing a vacuum. A section of screen held in place over the opening 15 by a circular plate 16 is provided to prevent foreign matter from being drawn into the vacuum producing apparatus. Referring especially to FIG. 4, it will be noted that the circular pad 10 has a vertical edge at the periphery thereof and a bottom portion of reduced diameter for forming a downwardly facing shoulder 17 which extends completely around the periphery of the pad 10.

A flexible sealing ring, generally designated 18, adapted to extend around the periphery or rim of the pad 10 includes a generally vertically extending body portion 19 which is adapted to have the inner side thereof engageable with the vertical edge of the rim 12 of the gripping pad 10. Depending integrally from the body portion 19 are spaced-apart, inner and outer, work engaging lips 20 and 21, respectively. The inner lip 20 is inwardly offset from the body portion 19 and adapted to be snugly received under the shoulder 17 of the pad 10. A plurality of notches 22, as best seen in FIG. 5, are provided in the work engaging surface of the inner lip 20. These notches are adapted to extend from one side of the inner lip to the other side thereof. The outer lip 21 tapers to a reduced thickness to increase the flexibility of the same. The sealing ring 18 may be securely attached to the gripping pad 10 by a number of metal straps 23 connected in end to end relationship for completely encircling the vertically extending body portion of the flexible sealing ring. Each end of the straps 23 has an out-turned tip 24 adapted to be drawn together by a nut and bolt connection 25, in a known manner.

A plurality of sector-shaped mats or pads 26 are secured to the bottom face 27 of the vacuum gripping pad. These mats are made of rubber or other suitable resilient material and they are provided to prevent marring of the surface of a sheet of work being gripped. The exposed surface of the mats are ribbed for maintaining a vacuum over substantially the entire surface area of the pad 10.

The flexible sealing ring 18 is preferably made of neoprene, although of course it will be realized that the sealing ring may be made from any other suitable flexible, rubber-like material including various types of rubber and plastics. Preferably, the sealing ring is of molded construction.

Reference to FIG. 6 will show the vacuum gripping pad of this invention in gripping engagement with a work sheet designated 28. The gripping force for securing the work sheet to the gripping pad 10 is produced as follows:

The gripping pad is held substantially parallel to the surface of the work sheet, and the vacuum gripping pad 10 is moved towards the sheet 28 until the outer lip 21 is brought into engagement with the surface of the work sheet. A vacuum is applied to the gripping pad which will evacuate the entire area under the gripping pad bounded by the outer lip 21. Because of the flexibility of the outer lip 21 as the vacuum is increased the pad 10 will be drawn into closer engagement with the work sheet until the inner lip 20 engages the surface of the work sheet.

Continued evacuation of air under the pad 10 results in the forming of two separate vacuumized chambers beneath the pad as the inner lip 20 will be compressed to a degree where the notches 22 therein will be completely closed. One chamber 29 is defined within the inner lip 20 and between the bottom face 27 of the pad and the upper surface of the sheet 28. A second vacuum chamber 30 is defined between the lips 20 and 21 and the surface of the work sheet. When air is admitted to the chamber 29 for release of the sheet being gripped, this chamber will expand allowing the notches to open. Accordingly, continued admission of air to the underside of the vacuum gripping pad will result in the destruction of the vacuum in both chambers.

It will be apparent that the vacuum gripping pad having the flexible sealing ring of this invention is simple in construction thereby having the attendant advantages of easy and low cost manufacture. No machining or drilling is required at the periphery of the pad to adapt it for reception of the flexible sealing ring. The flexible sealing ring 18 is molded with a cross-sectional shape allowing it to be merely frictionally engaged at the vertical peripheral edge of the pad with the inner lip of the ring being inwardly offset and adapted for reception under the forwardly facing shoulder 17 cast in the pad 10. The sealing ring may be securely clamped in place by the bands 23 which encircle the vertically extending body portion 19 of the ring. It should be realized that by the construction of the sealing ring of this invention the particular means of holding the ring to the pad is not critical. For example, the sealing ring may be adhesively secured to the peripheral edge of the pad. It will be noted that when a vacuum is applied to the pad, the inner lip 20 receives the greatest part of the force holding the work sheet to the pad, which lip is disposed under the shoulder 17. The flexible sealing ring can be easily and quickly detached when it is desired to replace the same. Further, it will be realized that the flexible sealing ring of this invention is readily adaptable to vacuum gripping pads having shapes other than a circular shape.

The vacuum gripping pad having the flexible sealing ring 18 has been found to be very effective in securely gripping a work sheet. The provision of the two independent work engaging lips materially contributes to the positive forming of the seal around the periphery of the pad. The outer lip 21, which is quite flexible, readily forms a first seal, and upon the continued evacuation of air beneath the vacuum gripping pad the inner lip 20 is firmly and uniformly brought into contact with the surface of the work sheet. Since the lip 20 is disposed beneath the annular shoulder 17 of the pad 10, this lip will be pressed into intimate contact with the work. Because of these factors a very good contact can be made between the work engaging surface of the inner lip and the surface of the work sheet. The two separate vacuumized chambers provide an effective gripping means to securely grip a sheet of work. Because of the notches 22 formed in the inner lip 20, a single source of vacuum may be used to vacuumize both chambers.

Thus it can be seen that by this invention a vacuum gripping pad having a flexible sealing ring has been provided which will form an effective seal with a sheet of work to be gripped. The flexible sealing ring is easy and inexpensive to manufacture, and it can be quickly and easily secured to the periphery of a vacuum gripping pad without special fabrication being performed on the pad. The flexible seal includes inner and outer work engaging lips which produce positive seals when brought into contact with the surface of a work sheet.

While the invention has been shown in but one form it will be obvious to those skilled in the art that it is not so limited, but rather it is susceptible of various changes and modifications without departing from the spirit and scope of the appended claims.

What is claimed as new is:

1. A vacuum gripping member comprising in combination, a generally planar pad having an opening in the bottom face thereof adapted to be placed in communication with means for producing a vacuum, which pad has an upper portion with a generally vertical edge extending around the periphery thereof, and a bottom portion of reduced cross-section thereby forming a downwardly facing shoulder extending around the periphery of the pad, a flexible sealing ring secured to the periphery of said pad and comprising, a generally vertically extending body portion having the inner side thereof engageable with said edge of said pad, said body portion having inner and outer, spaced-apart, work engaging lips depending therefrom, said inner lip being inwardly offset from said edge and received under said shoulder in a snug engagement therewith and extending downwardly beyond the bottom face of said pad, said outer lip extending downwardly beyond the work engaging surface of said inner lip.

2. A vacuum gripping member comprising in combination, a generally planar pad having an opening in the bottom face thereof adapted to be placed in communication with means for producing a vacuum, which pad has an upper portion with a generally vertical edge extending around the periphery thereof, and a bottom portion of reduced cross-section thereby forming a downwardly facing shoulder extending around the periphery of the pad, a flexible sealing ring secured to the periphery of said pad and comprising, a generally vertically extending body portion having the inner side thereof engageable with said edge of said pad, said body portion having inner and outer spaced apart, work engaging lips depending therefrom, said inner lip being inwardly off-set from said edge and received under said shoulder in a snug engagement therewith and extending downwardly beyond the bottom face of said pad, said inner lip having a plurality of notches in the work engaging surface thereof adapted to extend from one side of the inner lip to the other side thereof, said outer lip adapted to extend downwardly and outwardly beyond the work engaging surface of said inner lip.

3. The flexible sealing ring according to claim 2 wherein said outer lip tapers to a reduced thickness at the work engaging surface thereof for increasing the flexibility of said outer lip.

4. In a vacuum gripping member for gripping a sheet-like piece of the work, the combination of a generally planar pad having an opening in the bottom face thereof adapted to be placed in communication with means for producing a vacuum, which pad has an upper portion with a generally vertical edge extending around the periphery thereof, and a bottom portion of reduced cross-section thereby forming a downwardly faced shoulder extending around the periphery of the pad, a flexible sealing ring secured to the periphery of said pad and comprising, a generally vertically extending body portion having the inner side thereof engageable with said edge of said pad, said body portion having inner and outer, spaced-apart, work engaging lips depending therefrom, said inner lip being inwardly off-set from said edge and received under said shoulder in a snug engagement therewith and extending downwardly beyond the bottom face of said pad for defining between said face and said work a first vacuum chamber, said inner lip having a plurality of notches in the work engaging surface thereof adapted to extend from one side of the inner lip to the other side thereof, said outer lip adapted in its normal condition to extend downwardly and outwardly beyond the work engaging surface of said inner lip, and means engageable with said body portion for securing said ring to said pad, whereby upon the application of a vacuum to said pad said outer lip flexes allowing said inner lip to be brought into engagement with said work for forming a second vacuum chamber defined between said lips and said work.

References Cited by the Examiner
UNITED STATES PATENTS

| | | | |
|---|---|---|---|
| 2,123,549 | 7/38 | Williams | 248—363 |
| 2,229,375 | 1/41 | Eggleston | 294—64 X |
| 2,558,479 | 6/51 | Miller | 294—64 X |
| 2,853,333 | 9/58 | Littell | 294—64 |
| 3,005,652 | 10/61 | Helm | 294—64 |
| 3,084,928 | 4/63 | Opitz | 294—64 X |

SAMUEL F. COLEMAN, *Primary Examiner.*

ANDRES H. NIELSEN, *Examiner.*